June 23, 1936.                M. H. OSLIND                2,045,487

SNAP CLAMP FOR LATHE CHUCKS

Filed Feb. 5, 1936

Martin H. Oslind, INVENTOR

BY Victor J. Evans & Co.

ATTORNEY

UNITED STATES PATENT OFFICE 2,045,487

SNAP CLAMP FOR LATHE CHUCKS

Martin H. Oslind, Warren, Ohio

Application February 5, 1936, Serial No. 62,522

4 Claims. (Cl. 279—123)

The invention relates to clamps for lathe chucks and more especially to snap clamps for chucks of lathes.

The primary object of the invention is the provision of a clamp of this character, wherein in the use thereof upon the jaw of the chuck or lathe through association with shives an operator of the lathe can quickly set up a piece of work to be cut in the lathe and have the same properly aligned in the chuck and also retained level, the clamp being especially adaptable for accommodating thin work to the chuck of the lathe.

Another object of the invention is the provision of a clamp of this character, wherein the chuck jaw of a lathe is susceptible of having the steps therein changed so as to enable thin work to be held in the chuck.

A further object of the invention is the provision of a clamp of this character, wherein a chuck jaw wearing the clamp will have a shallow step upon which to place the rear face of the work for the holding of the latter.

A still further object of the invention is the provision of a clamp of this character, which is extremely simple in construction, thoroughly reliable and efficient for the purposes intended thereof, readily and easily applied and removed, strong, durable and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
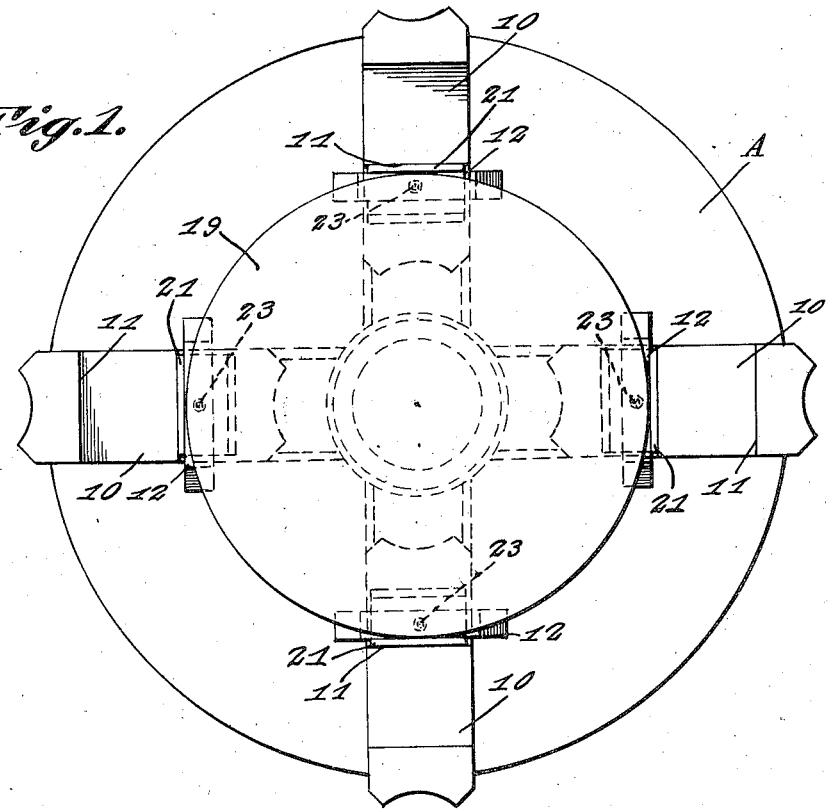
Figure 1 is a plan view of a lathe chuck showing a group of clamps carried by the jaws of said chuck and constructed in accordance with the invention.

Referring to the drawing in detail, A designates generally the chuck of a lathe and a series or plurality of jaws 10 are adjustably carried in the chuck in the usual manner and each jaw is formed with the steps 11, which is conventional.

Adapted to be engaged upon each jaw 10 is a clamp constituting the present invention for the purpose of making shallow the steps 11 thereof so that the chuck can handle relatively thin work to be operated upon in the working of the lathe.

Figure 3:
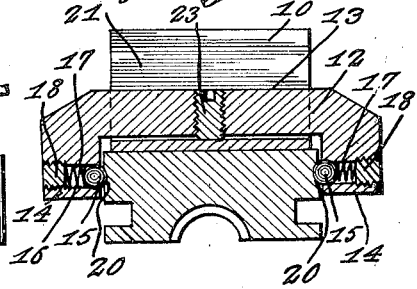
Figure 3 is a sectional view on the line 3—3 of Figure 1 looking in the direction of the arrows.
Figure 4:
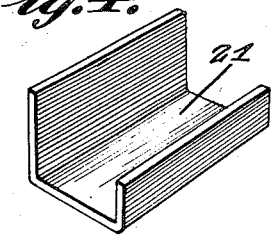
Figure 4 is a perspective view of a shive for association with the clamp.
Figure 5:
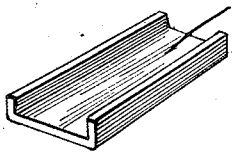
Figure 5 is a perspective view of another shive.

The clamp constituting the present invention comprises a substantially U-shaped bridge block 12 having a flat work engaging face 13 and the legs 14 of the bridge are equipped with friction balls 15, these being backed by coiled tensioning springs 16, the legs being provided with openings 17 for accommodating the friction balls 15 and the springs 16 while adjustable in these openings 17 are plugs 18 which close the outer ends of said openings 17 and retain the balls and springs in place. The adjustment of the plugs 18 enables variance in the tensioning of the springs 16 as should be obvious in Figure 3 of the drawing.

The clamp by inverting the bridge 12 will straddle a selected step 11 of the jaw 10 so that a piece of work 19 can rest on the face 13, the balls 15 being adapted to seat within depressions in opposite side faces of the jaw 10, each depression being indicated at 20, and in this manner the clamp will be firmly engaged upon the jaw for the purpose of aligning the work 19 and the setting of the same in the chuck A.

Figure 2:
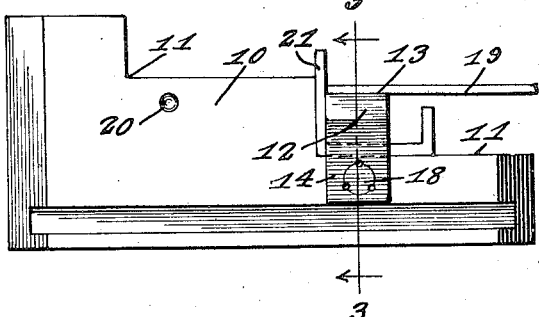
Figure 2 is a side elevation of one of the jaws removed from the chuck.

Usable with the clamp bridge 12 are shives 21 and 22, respectively, one being usable at a time and this bridge 12 straddles the shive used when seated upon the step 11 of the jaw 10. Each shive 21 and 22 is for the purpose of raising the clamp 12 with respect to the step face 11 of the jaw 10 for alignment of the work in the chuck as well as for leveling the group of clamps as carried by the respective jaws of the chuck or for maintaining the work out of level position. The association of a shive with the clamp bridge 12 is clearly shown in Figures 1, 2 and 3 of the drawing when the clamps are worn by the jaws 10 of the chuck A.

The legs 14 of the bridge 12 in their relation to each other form a crotch in the said bridge to accommodate the jaw 10 of the chuck A.

The depressions 20 in opposite faces of the jaw 10 are located so as to have the bridge 12 in a position for the shive to abut the riser of the steps 11 on the jaw, the adjustment of the jaw being had in the usual manner according to the nature of the work to be carried in the chuck A.

In the use of the clamp thin work can be carried in the chuck and properly aligned as said work is backed by the bridge 12 on the jaw 10 of the chuck A.

The clamp on each jaw functions as a supplemental step to the jaw and also as a backing rest for the work when within the chuck.

The bridge 12 has threaded centrally therein a set screw 23 which enables a frictional hold on the shive when straddled by the bridge 12 when the clamp is upon the jaw 10 of the chuck A.

By placing more shives between the clamp and the jaw of selected jaws of the chuck A the work 19 can be held out of level so that angle cutting action will take place upon the work when the lathe is operated.

By the use of the balls 15 and the depressions 20 each clamp can be snapped onto the jaw and frictionally held thereon. Each clamp can be used with or without the shives 21 or 22 at the option of the operative of the lathe.

What is claimed is:

1. The combination with a chuck jaw having steps, of a clamp comprising a U-shaped member for bridging a selected step of said jaw, and tensioned ball latches carried on opposite sides of the said member and frictionally engageable with opposite sides of said jaw.

2. The combination with a chuck jaw having steps, of a clamp comprising a U-shaped member for bridging a selected step of said jaw, and tensioned ball latches carried on opposite sides of the said member and frictionally engageable with opposite sides of said jaw, the said jaw being formed with depressions in opposite sides thereof for accommodating the said latches.

3. The combination with a chuck jaw having steps, of a clamp comprising a U-shaped member for bridging a selected step of said jaw, tensioned ball latches carried on opposite sides of the said member and frictionally engageable with opposite sides of said jaw, the said jaw being formed with depressions in opposite sides thereof for accommodating the said latches, and shives selectively interfitted with the member and said jaw.

4. The combination with a chuck jaw having steps, of a clamp comprising a U-shaped member for bridging a selected step of said jaw, tensioned ball latches carried on opposite sides of the said member and frictionally engageable with opposite sides of said jaw, the said jaw being formed with depressions in opposite sides thereof for accommodating the said latches, shives selectively interfitted with the member and said jaw, and means carried by the member for holding the member and shive in related position with respect to each other.

MARTIN H. OSLIND.